United States Patent [19]

Abthoff et al.

[11] 4,343,149
[45] Aug. 10, 1982

[54] SOOT FILTER IN THE EXHAUST GAS STREAM OF AIR-COMPRESSING INTERNAL COMBUSTION ENGINES

[75] Inventors: Jörg Abthoff, Plüderhauser; Hans-Dieter Schuster, Schorndorf; Hans-Joachim Langer, Remseck; Rolf Gabler, Waiblinger, all of Fed. Rep. of Germany

[73] Assignee: Daimler-Benz Aktiengesellschaft, Stuttgart, Fed. Rep. of Germany

[21] Appl. No.: 97,694

[22] Filed: Nov. 27, 1979

[30] Foreign Application Priority Data

Dec. 2, 1978 [DE] Fed. Rep. of Germany ....... 2852226

[51] Int. Cl.³ .............................................. F01N 3/02
[52] U.S. Cl. ...................................... 60/311; 55/484; 55/487; 55/523; 55/529; 55/DIG. 30
[58] Field of Search ................. 60/311, 297, 296, 302; 55/DIG. 30, 484, 487, 523, 529, DIG. 10

[56] References Cited

U.S. PATENT DOCUMENTS

| 3,881,316 | 5/1975 | Bunda | 60/302 |
| 3,937,015 | 2/1976 | Akado | 60/288 |
| 4,167,852 | 9/1979 | Ludecke | 60/311 |
| 4,205,971 | 6/1980 | Abthoff | 60/311 |

Primary Examiner—Douglas Hart
Attorney, Agent, or Firm—Craig and Antonelli

[57] ABSTRACT

A soot filter in the exhaust gas flow of air-compressing internal combustion engines, with a preferably cylindrically shaped filter housing arranged in proximity of the exhaust of the internal combustion engine, to which are connected radial or tangential inlet connections and in which is arranged ceramic fiber material; the fiber material forms hollow spaces together with the inner wall surfaces of the filter housing, which hollow spaces receive the exhaust gases after flowing through the filter parts and which conduct the exhaust gases in the axial direction of the filter housing to the exhaust line axially connected thereto.

8 Claims, 3 Drawing Figures

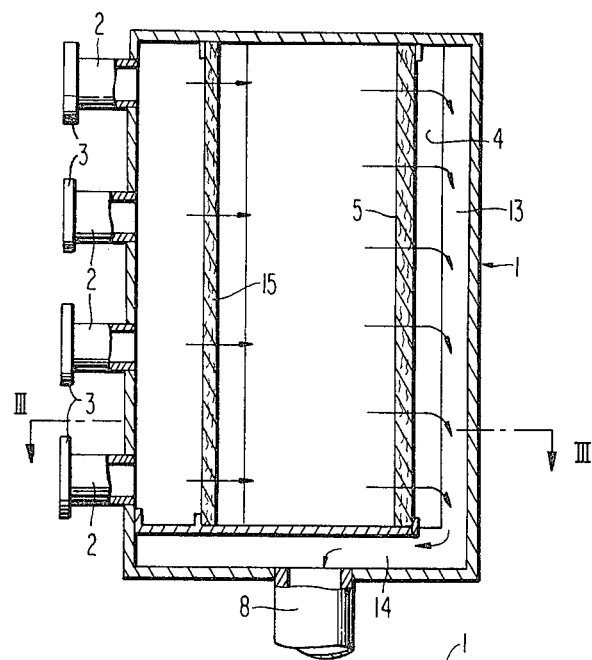
FIG 1
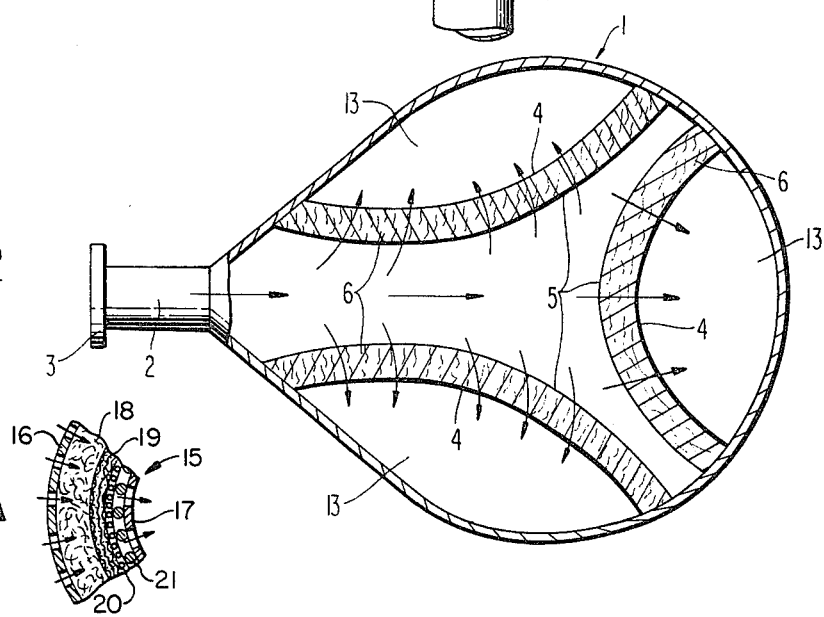
FIG 2
FIG 3A
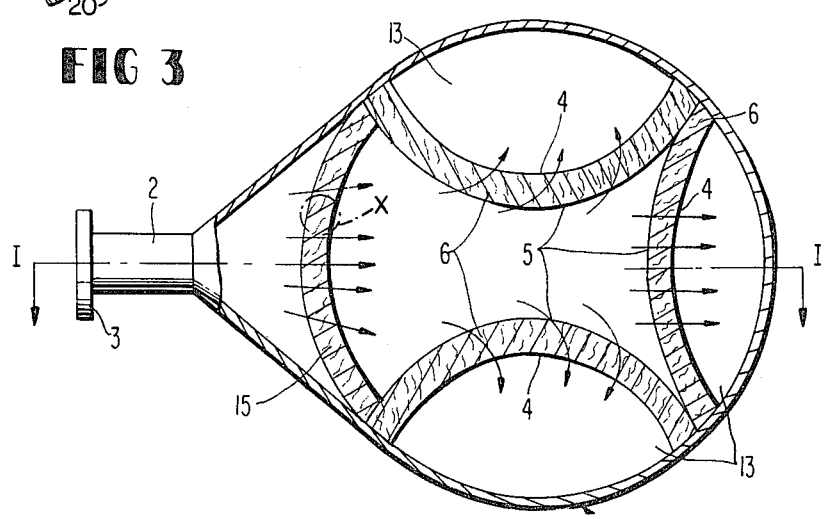
FIG 3

SOOT FILTER IN THE EXHAUST GAS STREAM OF AIR-COMPRESSING INTERNAL COMBUSTION ENGINES

The present invention relates to a soot filter in the exhaust gas stream of air-compressing internal combustion engines, in which a preferably cylindrically shaped filter housing is arranged in proximity of the exhaust of the internal combustion engine, to which short inlet connecting pipes are radially or tangentially connected and in which ceramic fiber material is arranged, as disclosed in U.S. Pat. No. 4,205,971 of June 3, 1980, the subject matter of which is incorporated herein by reference.

In the soot filter according to the aforementioned German patent application, the exhaust gas flows through the filter material cylindrically shaped in cross section radially from the outside toward the inside. In such an arrangement, the exhaust gas comes into contact with a relatively large surface that is formed by the filter housing, and as a result thereof, loses to a large extent a part of its heat energy. The heat quantity which is carried off in this manner to the outside is subsequently no longer available in the exhaust gas and is missing for afterburning purposes of the soot.

It is the aim of the present invention to avoid this disadvantage and to propose a filter, in which less heat energy is given off toward the outside by way of the outer jacket or casing of the filter housing.

The underlying problems are solved according to the present invention in that the filter material forms hollow spaces together with the inner wall of the filter housing, which hollow spaces receive the exhaust gases after flowing through the filter parts and which conduct the exhaust gases in the axial direction of the filter housing toward the exhaust line axially connected thereto. As a result of this construction of the filter and of the heat savings conditioned thereby, the surfaces acted upon by the exhaust gas can also be kept considerably smaller and the heat contained in the exhaust gas can be utilized better. Furthermore, it is possible thereby that the operating range of this filter can be displaced toward lower exhaust gas temperatures.

The ceramic fiber material may consist of an outer layer of loose ceramic fiber and of an inner woven ceramic fiber mat. Additionally, the ceramic fiber material may be supported externally and internally by apertured sheet metal plates. It is additionally advantageous for rigidity reasons if the filter walls are constructed curved or arcuately.

In order to increase the efficacy of the filter, the soot filter of the present invention may be connected as fine filter downstream of a coarse filter. The entire filter may thereby be composed of a part traversed from the outside toward the inside and by an adjoining part traversed from the inside toward the outside, whereby the former may be a coarse filter and the latter a fine filter. The coarse filter may thereby be constructed as disclosed in the aforementioned U.S. patent, according to which the ceramic fiber filter material supported between an outer and an inner apertured sheet metal member consists of an outer layer of loose ceramic fiber wadding and of an inner layer of woven ceramic fiber matting supporting the outer layer, whereby the inner layer of ceramic fiber matting is itself supported by a first wire mesh having a relatively small mesh size and a second wire mesh having a larger mesh size and disposed between the first wire mesh and the inner apertured sheet metal member.

In order to reduce the output loss of the filter, the filter insert may also be constructed star-shaped. As a result thereof, the filter surface can be increased and therewith the exhaust gas counter-pressure, which reduces the output, can be lower.

Accordingly, it is an object of the present invention to provide a soot filter for the exhaust gases of air-compressing internal combustion engines, which avoids by simple means the aforementioned shortcomings and drawbacks encountered in the prior art.

Another object of the present invention resides in a soot filter in the exhaust gas stream of air-compressing internal combustion engines which reduces the heat losses in the exhaust gas stream as a result of contact with the cooler surfaces of the filter housing.

A further object of the present invention resides in a soot filter of the type described above, in which a greater amount of heat energy is available in the exhaust gas flow for the purpose of afterburning of the soot.

Still a further object of the present invention resides in a soot filter which permits smaller surfaces that are acted upon by the exhaust gases while assuring at the same time better utilization of the heat energy contained in the exhaust gases.

Still a further object of the present invention resides in a soot filter of the type described above which not only is characterized by a high degree of efficiency but also is simple and exhibits considerable sturdiness and rigidity of its filter parts.

These and other objects, features and advantages of the present invention will become more apparent from the following description when taken in connection with the accompanying drawing which shows, for purposes of illustration only, two embodiments in accordance with the present invention, and wherein:

FIG. 1 is an axial cross-sectional view through a soot filter according to the present invention with an inlet-connected coarse filter, taken along line I—I in FIG. 3;

FIG. 2 is a transverse cross-sectional view through a modified embodiment of a soot filter in accordance with the present invention generally taken in a similar plane as the one indicated by line III—III of FIG. 1, but without inlet-connected coarse filter; and FIG. 3 is a transverse cross-sectional view through the soot filter of FIG. 1 in accordance with the present invention, taken along line III—III in FIG. 1 and FIG. 3A is an enlargement of detail X of FIG. 3.

Referring now to the drawing wherein like reference numerals are used throughout the various views, the soot filter illustrated in FIGS. 1 and 3 includes a cylindrical filter housing generally designated by reference numeral 1, into which radially terminating inlet connections 2 conduct exhaust gases which are exhausted from an internal combustion engine (not shown). The inlet connections 2 may be secured by means of flanges 3 at the exhaust lines of the internal combustion engine.

Ceramic fiber material 6 is arranged inside the filter housing 1 between an apertured sheet metal member 4 and an apertured sheet metal member 5, through which exhaust gases coming from the inlet connections 2 can pass for purposes of purification and cleaning. Hollow spaces 13 are formed by the arcuately constructed filter walls 4 to 6 and parts of the filter housing 1, through which the exhaust gases can be conducted to the exhaust line 8 by way of a common chamber 14, after the exhaust gases have passed through the filter walls.

It is additionally illustrated in FIGS. 1 and 3 that a coarse filter 15 may be arranged upstream of the filter walls 4 to 6 which are constructed as fine filters, whereby the coarse filter may also be constructed curved or arcuately shaped for rigidity reasons. The coarse filter 15 may thereby be also constructed as disclosed in the aforementioned German application.

The details of coarse filter 15 may be seen with reference to FIG. 3A, wherein the ceramic fiber material is supported between an outer apertured sheet metal member 16 and an inner apertured sheet metal member 17. Furthermore, the ceramic filter material consists of an outer layer of loose ceramic fiber wadding 18 and an inner layer of woven ceramic fiber matting 19 which supports outer layer 19, and is itself supported by a first wire mesh 20 having a relatively small mesh size and a second wire mesh 21 having a larger mesh size and disposed between the first mesh 20 and apertured member 17.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A soot filter in the exhaust gas flow of an air-compressing internal combustion engine, comprising an approximately cylindrically-shaped filter housing means arranged for receiving exhaust gases from the internal combustion engine, inlet connection means connected to the filter housing means and ceramic fiber material arranged in the filter housing means, characterized in that the fiber material is constructed as a plurality of arcuately-shaped filter walls which bow inwardly, said filter walls, together with the inner wall surfaces of the filter housing means, form hollow spaces that extend lengthwise within the housing means in a manner requiring the exhaust gases to pass through the filter walls prior to entering the hollow spaced, said hollow spaces forming a means for conducting the exhaust gases essentially in an axial direction of the filter housing means to an exhaust line means, said exhaust line means being connected to an end wall of said filter housing means so as to extend therefrom substantially in said axial direction.

2. A soot filter according to claim 1, characterized in that the inlet connection means are connected to the cylindrical filter housing means so as to extend therefrom substantially in a radial direction.

3. A soot filter according to claim 1, characterized in that the filter walls are connected as a fine filter located downstream of a coarse filter that is mounted within the housing means.

4. A soot filter according to claim 3, characterized in that the coarse filter includes, between apertured outer and inner sheet metal members, an outer layer of loose ceramic fiber wading and an inner layer of woven ceramic fiber matting.

5. A soot filter according to claim 3, wherein said coarse filter is constructed as an arcuately-shaped filter wall which extends transversely of said inlet connection means and is bowed outwardly towards same.

6. A soot filter according to claim 4, characterized in that the inner layer of ceramic fiber matting is supported by a first wire mesh having a relatively small mesh size and a second wire mesh having a relatively larger mesh size between the first mesh and the corresponding apertured sheet-metal member.

7. A soot filter according to claim 1, characterized in that the ceramic fiber material includes an outer layer of loose ceramic fiber mats and an inner woven ceramic fiber mat.

8. A soot filter according to claim 7, characterized in that the inlet connection means are connected to the cylindrical filter housing means so as to extend therefrom substantially in a radial direction.

* * * * *